US006913740B2

United States Patent
Polverejan et al.

(10) Patent No.: US 6,913,740 B2
(45) Date of Patent: Jul. 5, 2005

(54) GRAPHITE NANOCATALYSTS

(75) Inventors: Mihai Polverejan, Norwich, CT (US);
Christopher Marotta, Boulder, CO
(US); R. Terry K. Baker, Holliston,
MA (US)

(73) Assignee: Catalytic Materials, Inc., Holliston, MA (US)

( * ) Notice: Subject to any disclaimer, the term of this patent is extended or adjusted under 35 U.S.C. 154(b) by 0 days.

(21) Appl. No.: 10/712,247

(22) Filed: Nov. 13, 2003

(65) Prior Publication Data

US 2004/0141906 A1 Jul. 22, 2004

Related U.S. Application Data

(60) Provisional application No. 60/426,198, filed on Nov. 14, 2002.

(51) Int. Cl.$^7$ ............................................. C01B 31/18
(52) U.S. Cl. ............................ 423/418.2; 423/580.1
(58) Field of Search ......................... 423/418.2, 580.1

(56) References Cited

U.S. PATENT DOCUMENTS

| | | | |
|---|---|---|---|
| 5,149,584 | A | 9/1992 | Baker et al. |
| 5,413,866 | A | 5/1995 | Baker et al. |
| 5,458,784 | A | 10/1995 | Baker et al. |
| 5,538,929 | A | 7/1996 | Sudhakar et al. |
| 5,569,635 | A | 10/1996 | Moy et al. |
| 5,618,875 | A | 4/1997 | Baker et al. |
| 5,653,951 | A | 8/1997 | Rodriguez et al. |
| 5,972,525 | A | 10/1999 | Mori et al. |
| 6,159,892 | A | 12/2000 | Moy et al. |
| 6,277,780 | B1 | 8/2001 | Beckler et al. |
| 6,537,515 | B1 | 3/2003 | Baker et al. |

OTHER PUBLICATIONS

E. Theodoridou, A. D. Jannakoudakis, J. O. Besenhard and R. F. Sauter, "Carbon Fibre–Supported Noble Metal Catalysts: Optimization of Fibre Pretreatment", Synthetic Metals, 1986, pp. 125–135.

C. Pham–Huu, N. Keller, L. J. Chabonniere, R. Ziessel, and M. J. Ledoux, "Carbon Nanofiber Supported Palladium Catalyst for Liquid–Phase Reactions. An Active and Selective Catalyst for Hydrogenation of Cinnamaldehyde into Hydrocinnamaldehyde", Journal of Molecular Catalyst A: Chemical, vol. 170, May, 2001, pp. 155–163.

M. S. Hoogenraad, R.A.G.M.M. van Leeuwarden, G. J. B van Breda Vriesman, A. Broersma, A. J. van Dillen and J.W. Geus, "Metal Catalysts supported on a Novel Carbon Support". Preparation of Catalysts VI, (G. Poncelet et al. Editors), 1995, pp. 263–271.

Colin Park and R. Terry K. Baker, "Catalytic Behavior of Graphite Nanofiber Supported Nickel Particles. 2. The Influence of the Nanofiber Structure", American Chemical Society, 1998.

Nelly M. Rodriguez, Myung–Soo Kim, and R. Terry K. Baker, "Carbon Nanfibers: A Unique Catalyst Support Medium", The Journal of Physical Chemistry, 1994, pp. 13108–13111.

Keller et al, 'The Catalytic use of Onion–Like Carbon Materials for Styrene Synthesis by Oxidative Dehydrogenation of Ethylbenzene' Agnew. Chem. Int. Ed. vol. 41 #11 1885.

Mesh et al., 'Carbon Nanofiliments in Heterogeneous Catalysis: An Industrial Application for New Carbon Materials?' Angew. Chem. Int. Ed. vol. 40 #11 2066–2068.

*Primary Examiner*—Stuart Hendrickson
(74) *Attorney, Agent, or Firm*—Henry E. Naylor of Kean, Miller, Hawthrone, D'Armond, McCowan & Jarman, LLP (57) ABSTRACT

Novel catalysts comprised of graphitic nanostructures. The graphitic nanostructure catalysts are suitable for catalyzing reactions such as oxidation, hydrogenation, oxidative-hydrogenation, and dehydrogenation.

10 Claims, 2 Drawing Sheets

Figure 2

GRAPHITE NANOCATALYSTS

CROSS REFERENCE TO RELATED APPLICATIONS

This application is based on Provisional Application 60/426,198, filed Nov. 14, 2002.

FIELD OF THE INVENTION

This invention relates to novel catalysts comprised of graphitic nanostructures. The graphitic nanostructure catalysts are suitable for catalyzing reactions such as oxidation, hydrogenation, oxidative-hydrogenation, and dehydrogenation.

BACKGROUND OF THE INVENTION

Much work has been done over the years in the field of heterogeneous catalysis. Such catalysts have experienced enormous commercial success in many chemical processes, particularly petroleum and petrochemical process applications. Conventional heterogeneous catalysts are typically comprised of one or more catalytically active metals, particularly Group VIII and Group VI metals on an inorganic support. The inorganic support is typically a metal oxide such as alumina, silica, alumina-silica, titania, magnesia, as well as molecular sieves. Various forms of carbon have also been suggested as being suitable as catalyst support materials. For example, U.S. Pat. Nos. 5,538,929 and 6,277,780 teach the use of a phosphorus treated activated carbon as catalyst supports. Also, U.S. Pat. No. 5,972,525 teaches solid particles comprised of carbon and metal oxides as being suitable catalyst supports. While most of the art teaches the use of conventional carbon, such as activated carbon as catalyst supports, two patents, U.S. Pat. Nos. 5,569,635 and 6,159,892 disclose the use of nano-size cylindrical carbon "fibrils" as catalyst supports. Various catalytically active metals, preferably noble and non-noble Group VIII metals, such as Fe and Pt, are deposited onto the fibril support material. Metal oxides, such as $Fe_2O_3$ can also act as a catalyst when deposited onto the carbon fibrils.

While it has been known for many years that both macro and nano-size carbon particles are suitable support materials for certain types of catalysts, it has not been known that some types of graphitic nanostructures, having unique and unexpected properties, are suitable as catalyst themselves, without the addition of a catalytically active metal.

SUMMARY OF THE INVENTION

In accordance with the present invention there is provided a catalyst composition comprised of graphitic nanostructures which nanostructures are comprised of a plurality of graphite platelets aligned parallel, perpendicular, or at an angle to the longitudinal axis of the nanostructure and which graphitic nanostructures are characterized as having at least about 1% edge regions.

In a preferred embodiment, the graphite nanostructure is one wherein the graphite platelets are aligned substantially parallel to the longitudinal axis of the nanostructure.

In another preferred embodiment the catalyst composition is suitable for use in reactions selected from oxidation, hydrogenation, oxidative-hydrogenation, oxidative-dehydrogenation and dehydrogenation.

Also in accordance with the present invention there is provided a process selected from oxidation, hydrogenation, oxidative-hydrogenation, oxidative-dehydrogenation and dehydrogenation which is catalyzed by a catalyst composition comprised of graphitic nanostructures which nanostructures are comprised of a plurality of graphite platelets aligned parallel, perpendicular, or at an angle to the longitudinal axis of the nanostructure and which graphitic nanostructure is characterized as having at least about 1% edge regions.

In another preferred embodiment, hydrogen and carbon dioxide are reacted in the presence of the graphitic nanostructures of the present invention to produce carbon monoxide and water.

In still another preferred embodiment of the present invention carbon monoxide and water are reacted in the presence of the graphitic nanostructures of the present invention to produce hydrogen and carbon dioxide.

In a further preferred embodiment of the present invention carbon monoxide and oxygen are reacted in the presence of the graphitic nanostructures of the present invention to produce carbon dioxide.

In yet another preferred embodiment of the present invention $N_2O$ is reacted in the presence of the graphitic nanostructures of the present invention to produce $N_2$ and $O_2$.

In still another preferred embodiment $SO_2$ is reacted in the presence of the graphitic nanostructures of the present invention to produce $SO_3$.

BRIEF DESCRIPTION OF THE FIGURES

FIG. 1a is a representation of a platelet carbon nanofiber, which is comprised of substantially graphite sheets that are substantially perpendicular to the longitudinal axis, or growth axis, of the nanofiber.

FIG. 1b is a representation of a cylindrical carbon nanostructure that is comprised of continuous carbon sheets and is in the form of tube within a tube within a tube and having a substantially hollow center.

FIG. 1c is a representation of a ribbon carbon nanofiber of the present invention that is comprised of graphitic sheets that are substantially parallel to the longitudinal axis of the nanofiber.

FIG. 1d is a representation of a faceted tubular carbon nanofiber of the present invention and is comprised of continuous sheets of graphic carbon but having multifaceted flat faces. The graphitic sheets are also substantially parallel to the longitudinal axis of the nanofiber.

FIG. 1e is a representation of a herringbone carbon nanofiber wherein the graphitic platelets or sheets are at an angle to the longitudinal axis of the nanofiber.

DETAILED DESCRIPTION OF THE INVENTION

Figure 2:
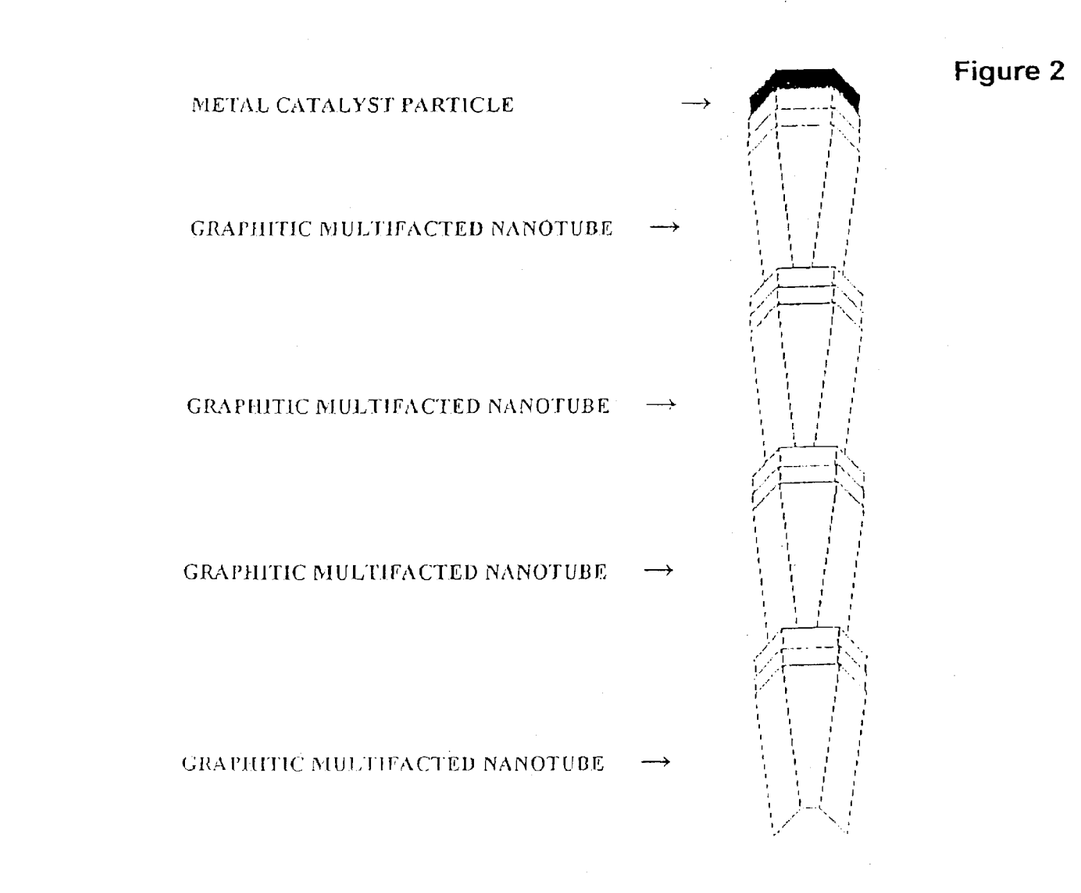
FIG. 2 is a rough representation of the primary features of the multifaceted carbon nanotubes produced in accordance with the present invention. It shows a non-cylindrical multifaceted tubular structure containing a substantial amount of edge sites growing from a metal catalyst particle. The tubular nanostructure also shows a tube within a tube structure.

The catalysts of the present invention are comprised of graphitic nanostructures, preferably carbon nanofibers. These carbon nanofibers are themselves comprised of a plurality of graphite platelets, also sometimes called graphite sheets, that are aligned parallel, perpendicular, or at an angle to the longitudinal (growth) axis of the nanofiber. The most preferred carbon nanostructures for purposes of the present invention are graphitic nanofibers. These carbon nanofibers are novel materials having a unique set of properties that include: (i) a surface area from about 20 to 3,000 m$^2$/g, preferably from about 50 to 800 m$^2$/g, more preferably from about 100 to 700 m$^2$/g, and most preferably from about 250 to 350 m$^2$/g, which surface area is determined by N$_2$ adsorption at −196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 0.40 nm, preferably about 0.335 nm. The surface area of the graphite nanofibers can be increased by careful activation with a suitable etching agent, such as carbon dioxide, steam, or the use of a selected catalyst, such as an alkali or alkaline-earth metal. The interstices are the distance between the graphite platelets.

The overall shape of the nanofibers can be any suitable shape. Non-limiting examples of preferred shapes include straight, branched, twisted, spiral, helical, and coiled. The graphitic platelets can be oriented from substantially perpendicular to substantially parallel to the longitudinal, or growth, axis of the nanofiber. In the case where the graphitic platelets are oriented substantially perpendicular to the growth axis, the carbon nanofibers are sometimes referred to as "platelet". In the case where the graphitic platelets are oriented substantially parallel to the growth axis, the resulting nanofibers can be either "ribbon-like" or "multifaceted tubular". The ribbon-like structures are composed of discontinuous or non-linked platelets and are thought of as a series of sheets aligned substantially parallel to each other. The multifaceted tubular nanostructures have parallel graphite platelets linked at an angle different than 180°, preferably about 60° so that they form a non-cylindrical multifaceted tubular structure.

Carbon nanoribbons, as well as other preferred carbon nanostructures of the present invention, are those wherein at least about 1%, preferably at least about 50%, more preferably at least about 80%, and most preferably at least about 95% of the edge sites are exposed. Preferred carbon tubular type materials are those wherein the platelets are discontinuous to form a non-cylindrical, but multi-faceted tubular structure, somewhat like the structure of a multi-faced pencil or "allen" wrench. Typically, the multifaceted graphitic nanotube structure will be nanotube within a nanotube structure. The graphitic platelets can also be oriented at an angle to the growth axis and thus are sometime referred to as "herringbone". Further, the surface area of the carbon nanofibers can be dramatically increased by careful activation with a suitable etching agent, such as carbon dioxide, steam, or the use of selected catalyst, such as an alkali or alkaline-earth metal.

The graphitic nano-catalysts of the present invention can be catalytically grown from unsupported metal powders. In this case, a carbon-containing compound is decomposed in the presence of the metal catalyst powder at temperatures from about 450° C., to about 800° C., more preferably from about 550° C. to about 700° C. It is also preferred that hydrogen be present during the decomposition of the carbon-containing compound.

Catalysts suitable for growing the carbon nanostructures of the present invention include single metals, as well as alloys and multi-metallics. If the catalyst is a single metal then it will preferably be a Group VIII metal selected from Fe, Ni, and Co. If the catalyst is an alloy or multimetallic material, then it is comprised of a first metal component that will be one or more Group VIII metals and a second metal that is preferably one or more Group IB metals, such as Cu, Ag, and Au. Preferred are Cu and Ag with Cu being the most preferred. If the catalyst is an alloy or multimetallic it is preferred that the catalyst be comprised of two Group VIII metals or one Group VIII metal and one Group IB metal. It will be understood that Zn can be used in place of one or more of the Group VIII metals. The Group IB metals is present in an amount ranging from about 0.5 to 99 at. % (atomic %). For example the catalyst can contain up to about 99 at. %, even up to about 70 at. %, or even up to about 50 at. %, preferably up to about 30 at. %, more preferably up to about 10 at. %, and most preferably up to about 5 wt. % copper, of Group IB metal with the remainder being a Group VIII metal, preferably nickel or iron, more preferably iron.

Catalysts having a high copper content (70 at. % to 99 at. %) will typically generate nanofibers which are predominantly helical or coiled, and which have a relatively low crystallinity (from about 5 to 25%). Lower concentrations of copper, e.g., 0.5 to 30 at. % have a tendency to produce spiral and branched nanofibers, whereas a catalyst with about 30 to 70 at. %, preferably 30 to 50 at. % copper will produce predominantly branched nanofibers. A third metal can also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of Cu in combination with Fe, Ni, or Co. More preferred is Cu in combination with Fe and/or Ni from an economic point of view. A catalyst of which Fe is used in place of some of the Ni would be less expensive than a catalyst comprised of Cu in combination with only Ni.

Any suitable method can be used to produce the powdered metal catalyst for growing the graphitic nano-catalyst of the present invention. As previously mentioned, it is most preferred in the practice of the present invention that the carbon nanostructures be grown from unsupported metallic powders. A preferred method for preparing suitable unsupported metal catalytic powders is the use of colloidal techniques for precipitating them as metal oxides, hydroxides, carbonates, carboxylates, nitrates, etc. Such a process typically involves dissolving salts of each metal of the catalyst in an appropriate solvent, preferably water. A suitable precipitating agent, such as an ammonium carbonate, ammonium bicarbonate or ammonium hydroxide is added to the solution, thereby causing the metal to precipitate out as the corresponding metal carbonate or hydroxide. The precipitate is then dried at a temperature greater than about 100° C., preferably from about 105° C. to about 120° C., and more preferably at about 110° C. After drying, the precipitate is mixed with a suitable dispersing agent and calcined at a temperature from about 200° to 400° C., preferably from about 200° to about 300° C., thereby converting the individual metals to their respective oxide form.

Alternatively, the dispersing agent can be incorporated after calcination. The mixed oxide forms, together with the dispersing agent, are then milled, preferably ball milled, under suitable conditions, to produce a dispersed metal powder catalyst of desired size for carbon nanostructure growth. The milled metal powder mixture is then heated, in a hydrogen-containing atmosphere, at a temperature from about 400° to about 600° C., preferably from about 450° to 550° C., for an effective amount of time, to produce the catalyst in its metallic state. The dispersing agent may also be reduced to its metallic state, depending on the dispersing agent. For example, if the dispersing agent is a metal oxide it can be reduced to its metallic state, whereas if the dispersing agent is a salt, such as sodium chloride, it will remain as is during treatment with a hydrogen atmosphere. By effective amount of time, we mean that amount of time needed to reduce substantially all of the metal oxides to the respective metal or alloy having a suitable particle size. A typical amount of time will generally be from about 15 to 25 hours. Suitable particle sizes are from about 2.5 rum to about 150 nm, preferably from about 2.5 nm to about 100 nm, and more preferably from about 2.5 nm to about 20 nm. Following this treatment the chemically reduced catalyst is cooled to about room temperature in a helium environment before being passivated in a 2% oxygen/helium mixture for 1 hour at about room temperature (24° C.).

Salts of the catalytic metal used for growing the graphitic nano-catalysts of the present invention are salts that are soluble in water, organic solvents, and diluted mineral acids. Non-limiting examples of water-soluble salts suitable for use herein include nitrates, sulfates and chlorides. Non-limiting examples of preferred salts soluble in organic solvents, which are suitable for use herein, include formates, acetates, and oxalates. Non-limiting examples of organic solvents that are suitable for use herein include alcohols, such as methanol, ethanol, propanol, and butanol; ketones, such as acetone; acetates and esters; and aromatics, such as benzene and toluene.

Dispersing agents may also be used during the growth of the graphitic nano-catalysts of the present invention. Suitable dispersing agents are those disclosed in co-pending application U.S. Ser. No. 10/015,453 filed Dec. 11, 2001 which is incorporated herein by reference. In that application the dispersing agents are those that: (a) are substantially inert with respect to reaction with the carbon-containing gas at temperatures up to at least about 750° C.; (b) are substantially inert with respect to chemical interaction with the catalytic metals at temperatures up to at least about 750° C.; (c) do not have a deleterious effect on the catalytic activity of the catalytic metals; and (d) maintain their physical integrity at temperatures up to at least about 750° C. Preferred classes of compounds that can be used as dispersing agents in the practice of the present invention include alkaline and alkaline earth halides and metal oxides.

Carbon-containing compounds suitable for preparing the graphitic nanocatalysts of the present invention are compounds composed mainly of carbon atoms and hydrogen atoms, although carbon monoxide can also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating, or growth, zone during nanostructure growth. Hydrogen serves two complementary functions. For example, on the one hand it acts as a cleaning agent for the catalyst, and on the other hand it hydrogasifies, or causes carbon burn-off, of the carbon structure. By an effective amount, we mean that minimum amount of hydrogen that will maintain a clean catalyst surface (free of carbon residue), but not so much that will cause excessive hydrogasification, or burn-off, of carbon from the nanostructures and/or substrate structure, if present. Generally, the amount of hydrogen present will range from about 5 to 40 vol. %, preferably from about 10 to 30 vol. %, and more preferably from about 15 to 25 vol. %. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. A Cu:Ni catalyst is so active that it utilizes essentially all of the carbon deposited thereon to grow nanofibers, and thus, there is generally no carbon residue to clean off.

After the carbon nanostructures, preferably nanofibers, are grown, it may be desirable to treat the final structure with an aqueous solution of an inorganic acid, such as a mineral acid, to remove any excess catalyst particles. Non-limiting examples of mineral acids, which can be used, include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal.

As previously mentioned, the graphite nanocatalysts of the present invention are suitable for catalyzing a variety of chemical reactions. The reactants that are capable of undergoing catalytic transformation over carbon nanofibers include molecules possessing a double or triple polar bond. Examples of such groups include $C=O$, $N=O$, $C\equiv N$, $S=O$, $C=C$ and $C\equiv C$. Also included in this set of reactants are molecules having a $C-OH$ group, such as alcohols. Non-limiting examples of chemical reactions that can be catalyzed with the graphite nanocatalysts of the present invention include oxidation, hydrogenation, oxidative-hydrogenation, oxidative-dehydrogenation, and dehydrogenation. One preferred hydrogenation reaction is the hydrogenation of $CO_2$. The interconversion of $CO_2$ and CO, and possible transformation of these gases into value-added products play a key role in many of the world's current energy problems. Processes involving the sequestration or chemical conversion of $CO_2$ are topics of intense research activity since the gas has been identified as a greenhouse gas and is ultimately responsible for global warming. A particularly appealing system involves the hydrogenation of $CO_2$ into CO and steam via the reverse water-gas shift reaction (RWGS) followed by the catalytic decomposition of CO to form highly tailored graphitic nanotubes and nanofibers. This concept would be of interest not only from an environmental standpoint, but also economically attractive, since $CO_2$ is readily available as a cheap and plentiful by-product from oil and coal-based power plants.

Catalytic hydrogenation of $CO_2$ has some major advantages compared with other traditional methods of disposal. When the hydrogenation reaction is carried out over certain supported metal catalyst systems it is possible to convert $CO_2$ into a variety of value-added products such as methanol and hydrocarbons. Catalysts composed of metals such as Pt, Rh, Pd, Ru, Cu, Fe, Ni and Ag supported on various oxides including $Al_2O_3$, $SiO_2$, ZnO, $TiO_2$ and Y-zeolite have been found to be effective for converting $CO_2$ to CO and methanol. Unfortunately, the high cost and the regeneration/disposal operations make these systems unattractive for commercial applications. The inventors have unexpectedly found that certain graphite nanostructures function as catalysts for the reduction of $CO_2$ to CO in the presence of hydrogen (RWGS reaction) without the presence of a catalytically active metal. Conditions at which the hydrogenation reaction can be preformed include temperatures of about 400° C. to about 475° C. at CO:$H_2$ ratios of about 1:2.

A preferred oxidation reaction is the reaction of CO with $O_2$ to form $CO_2$. This reaction is typically performed over a supported metal-containing catalyst at relatively low temperatures. Clearly, the use of a graphitic nanostructure as the catalytic entity would be less expensive than a supported catalyst system. Moreover, since it is a relatively simple task to regenerate the spent graphitic nanostructure catalyst any problems associated with hazardous waste disposal will not be encountered.

The graphitic nanocatalysts of the present invention can also be used to catalyze reactions to eliminate pollutants such as $SO_x$ and $NO_x$. Although legislative controls have resulted in a significant reduction in the generation of toxic gases due to automobile emissions, the problem of atmospheric pollution still persists on a global scale. We are now confronted with various phenomena such as acid rain, the greenhouse effect, and depletion of the ozone layer in the upper atmosphere. The major pollutants are $NO_x$ and $SO_x$ that are present in the flue gas from fossil-fueled power generation plants. Nitrogen and sulfur oxides are the main causes of acid rain that has resulted in devastation of forests and killing of fish due acidification of lakes in both Europe and North America. $SO_x$ are also believed to be responsible for causing problems to human health associated with asthma. While $N_2O$ is thermodynamically unstable it does not undergo uncatalyzed decomposition until temperatures in excess of 625° C. A number of metal oxides are known to catalyze the decomposition, or reduction, of $N_2O$ into $N_2$ and $O_2$ at elevated temperatures. However, such systems do not maintain their activity for extended periods of time. Metal exchanged zeolites exhibit a high initial catalytic activity for this reaction, but the poor hydrothermal stability and sensitivity to sulfur poisoning has limited their practical applications. We have carried out this reaction over various types of carbon materials, including nanofibers, activated carbon and pitch-based carbon fibers. Significantly higher conversions of $N_2O$ into $N_2$ and $O_2$ were found to occur over the graphitic nanofibers of the present invention.

The temperature at which one can use carbon nanofibers as catalysts in an oxidizing environment is limited since the materials undergo gasification. In order to circumvent this problem the addition of a reducing agent such as CO is found to exert a beneficial effect on the catalyst stability. The uncatalyzed reaction between $N_2O$ and CO to form $N_2$ and $CO_2$ does not occur below 675° C. When various carbon materials were reacted in the $N_2O$/CO environment carbon gasification was effectively inhibited with the exception of an activated carbon sample. Once again, the graphitic nanofibers of the present invention were found to unexpectedly exhibit the highest catalytic activity for the reaction. Graphite nanofibers can also function as catalysts for the conversion of $SO_2$ to $SO_3$, which can subsequently be hydrolyzed to form a value-added product $H_2SO_4$.

Another preferred reaction is the oxidative dehydrogenation of ethylbenzene to styrene as set forth in the following examples.

The present invention will be illustrated in more detail with reference to the following examples, which should not be construed to be limiting in scope of the present invention.

EXAMPLES

Materials

The "platelet" graphitic nanofibers (CNF-P) used in these examples were prepared from the decomposition of carbon monoxide/hydrogen mixtures over copper-iron powdered catalysts at 600° C. The "faceted tubular" graphitic nanofibers (GNF-T) were grown from the interaction of Co/MgO with carbon monoxide/hydrogen mixtures at 600° C. The "herring-bone" graphitic nanofibers (GNF-H) were produced from the decomposition of ethylene/hydrogen mixtures over powdered copper-nickel catalysts at 600° C. Prior to use all nanofibers were treated in dilute mineral acid for a period of one week to remove the associated metal catalyst particles. For comparison purposes the behavior of two other types of materials were examined; Vulcan XC-72 carbon from Cabot Corp., Pitch-based carbon fibers from Amoco Performance Products and Darco G-60 active carbon.

The gases used in these examples were carbon monoxide (99.9%), ethylene (99.95%); hydrogen (99.999%), helium (99.99%) and argon (99.99%) were purchased from Air Products and dried before use. Reagent grade iron nitrate, cobalt nitrate, nickel nitrate, copper nitrate and magnesium oxide were used in the preparation of catalysts for carbon nanofiber growth and were obtained from Fisher Scientific.

Reactor Studies

In one series of comparative experiments 1.0 gram of graphitic nanofibers was placed in a 1.0-inch internal diameter, vertical quartz reactor system. The sample was heated at temperatures ranging from 350 to 550° C. in the presence of $CO_2/H_2$ mixtures at flow rates between 30 to 60 cc/min for various periods of time. An on-line gas chromatography unit was used to determine the concentrations of gaseous products together with unconverted reactants.

Examples 1

Effect of the $CO_2/H_2$ Ratio on the $CO_2$ to CO Conversion

In this series of experiments at the completion of the graphitic nanofibers growth step, the $C_2H_4/H_2$ (4:1) reactant gas mixture was stopped and the solid carbon product treated at 550° C. in a $CO_2/H_2$ (4:1) mixture for 20 mins and cooled to room temperature. Samples were subsequently reacted in various $CO_2/H_2$ mixtures at 400° C. for periods of up to 22 hours. The percentage conversion of $CO_2$ to CO for the various $CO_2/H_2$ mixtures is presented in Table 1 below. Inspection of these data reveals it is necessary to operate at a $CO_2/H_2$ ratio of 1:2 in order to achieve the highest conversion of $CO_2$ to CO.

TABLE 1

| $CO_2$:$H_2$ (10:20) | | $CO_2$:$H_2$ (20:20) | | $CO_2$:$H_2$ (15:30) | | $CO_2$:$H_2$ (20:40) | |
|---|---|---|---|---|---|---|---|
| | % $CO_2$ | | % $CO_2$ | | % $CO_2$ | | |
| Time (hr) | Conversion | Time (hr) | Conversion | Time (hr) | Conversion | Time (hr) | % $CO_2$ Conversion |
| 0.75 | 20.0 | 0.5 | 5.6 | 0.5 | 15.9 | 0.75 | 16.1 |
| 2.0 | 19.7 | 1.0 | 5.7 | 3.0 | 18.0 | 1.75 | 16.7 |
| 8.5 | 20.2 | | | 22.0 | 20.9 | 3.5 | 16.3 |

Example 2

Effect of Reaction Temperature on the $CO_2$ to CO Conversion

In a further set of experiments using a 1.0-gram sample of pretreated graphite nanofibers, the $CO_2/H_2$ ratio was maintained constant at (1:2) and the temperature of the system was sequentially increased from 350 to 475° C. At higher temperatures the gasification of the nanofibers by $CO_2$ starts to occur to form CO and a corresponding loss of the catalyst. The maximum temperature was therefore limited to 475° C. The variation in the percent conversion of $CO_2$ to CO is presented as a function of reaction temperature and time in Table 2 below. From these data it is evident that the optimum catalytic conversion of $CO_2$ to CO is achieved at 475° C. Furthermore, provided that the nanofiber catalyst has been activated by pretreatment in $CO_2/H_2$ (4:1) at 550° C. for a short time then it immediately reaches its optimum catalytic performance at any given reaction condition. This finding indicates that the pretreatment is responsible for generating favorable chemical functionalities on nanofiber edges that are the sites where the catalytic reaction takes place.

TABLE 2

| 350° C. | | 400° C. | | 450° C. | | 475° C. | |
|---|---|---|---|---|---|---|---|
| Time (hr) | % $CO_2$ Conversion | Time (hr) | % $CO_2$ Conversion | Time (hr) | % $CO_2$ Conversion | Time (hr) | % $CO_2$ Conversion |
| 0.5 | 6.0 | 0.75 | 22.4 | 0.5 | 33.4 | 0.5 | 36.0 |
| 1.0 | 6.4 | 1.75 | 21.0 | 2.5 | 33.8 | 1.5 | 36.3 |
|  |  | 24.0 | 21.7 | 19.0 | 33.4 | 20.0 | 36.9 |

Example 3

Effect of Reaction Time on the $CO_2$ to CO Conversion at 475° C.

The lifetime of the graphite nanofibers as a catalyst was investigated for the $CO_2/H_2$ (1:2) reaction at 475° C. at a total flow rate of 45 cc/min as a function of time. From the data given in Table 3 below it is evident that the activity of the solid carbon sample is maintained for over 100 hours on stream under these conditions and shows a slight decline after a period of 265 hours.

TABLE 3

| Time (hr) | % $CO_2$ Conversion |
|---|---|
| 1.0 | 37.1 |
| 3.0 | 40.5 |
| 4.0 | 40.1 |
| 20.0 | 40.2 |
| 97.0 | 40.0 |
| 116.0 | 39.3 |
| 265.0 | 36.3 |

Example 4

Performance of Graphite Nanofiber Catalysts as a Function of Various Pre-Treatments In this series of experiments the influence of various pre-treatments on the subsequent catalytic performance of graphitic nanofibers was investigated. At the completion of the synthesis step the samples were treated in helium, air or $CO_2/H_2$ (1:2) at 550° C. for a period of 30 mins. Following this step the temperature was lowered to 475° C. and each sample was subsequently reacted in 45-cc/min flow of $CO_2/H_2$ (1:2) for an extended period of time. From the data presented in Table 4 below it is apparent that the nature of the pretreatment is critical in order to attain the optimum catalytic performance. Exposure to a $CO_2/H_2$ (1:2) environment at 550° C. activates the nanofiber catalyst in the most effective manner. High activity is eventually achieved with samples pretreated in helium and air after the reaction has been carried out for increasing times. Clearly the $CO_2/H_2$ reactant mixture is responsible for generating the desired chemical functionalities on the nanofiber edge sites to attain optimum activity.

TABLE 4

| He | | Air | | $CO_2/H_2$ (1:2) | |
|---|---|---|---|---|---|
| Time (hr) | % $CO_2$ Conversion | Time (hr) | % $CO_2$ Conversion | Time (hr) | % $CO_2$ Conversion |
| 0.5 | 20.0 | 0.5 | 34.3 | 1.0 | 42.0 |
| 1.0 | 23.0 | 4.0 | 39.4 | 3.0 | 41.7 |
| 3.0 | 28.0 | — | — | 5.0 | 41.7 |
| 70.0 | 37.7 | 21.0 | 39.6 | 22.0 | 42.1 |

Example 5

Effect of Various Types of Materials on the $CO_2$ to CO Conversion at 475° C.

In this series of experiments a comparison was made of the catalytic performance of various types of graphite nanofibers materials for the $CO_2$ to CO conversion. These materials included three different types of graphite nanofibers "multifaceted tubular", "platelet" and "herring-bone" in which the graphene sheets were aligned parallel, perpendicular and at an angle to the fiber growth axis, respectively. In addition, the behavior of two other types of materials were examined; Vulcan XC-72 carbon from Cabot Corp. and Darco G-60 active carbon. Examination of the results shown in Table 5 below reveals that catalytic activity was only achieved when using the carbon nanofibers as the catalytic entities. Furthermore, the "platelet" type of GNF appeared to exhibit the highest catalytic activity, which is consistent with fact that this structure exposes the highest percent of edge sites. All experiments were carried out with 1.0-gram samples of the respective carbon materials, which were reacted at 475° C. for various periods of time in a $CO_2/H_2$ (1:2) mixture at a total flow rate of 45 cc/min.

TABLE 5

| Catalyst | Time (hours) | % $CO_2$ Conversion |
|---|---|---|
| GNF-H | 0.5 | 33.0 |
|  | 3.0 | 37.0 |
|  | 6.0 | 38.0 |
|  | 22.0 | 37.6 |
| GNF-P | 0.5 | 39.0 |
|  | 1.0 | 41.0 |
|  | 4.0 | 41.0 |
|  | 23.0 | 42.0 |
| GNF-T | 0.5 | 35.0 |
|  | 1.0 | 36.0 |
|  | 4.0 | 37.0 |
|  | 24.0 | 37.0 |
| Vulcan XC-72 | 0.4 | 0.0 |
|  | 4.0 | 0.0 |
| Darco G-60 | 0.5 | 0.0 |
|  | 16.0 | 0.0 |

Example 6

Performance of Graphite Nanofibers as a Catalyst for the Oxidation of Carbon Monoxide In a further set of experiments the potential of "multifaceted tubular" graphite nanofibers to function as catalysts for the oxidation of carbon monoxide to carbon dioxide was investigated. Prior to reaction the nanofibers were treated in air at 450° C. for 2.0 hours. Following this step the samples were reacted in a mixture of 2% CO/2% $O_2$/He mixture for 45 min periods at temperatures over the range 200 to 350° C. and the amount of $CO_2$ produced at each condition determined by an on-line gas chromatography unit. Inspection of the data given in Table 6 below shows that the nanofibers start to exhibit significant activity at about 240° C. and reach an optimum performance at 350° C. Above this temperature gasification of the solid carbon occurs and this reaction produces $CO_2$. As a consequence, at temperatures above 350° C. it is not possible to determine the effectiveness of the catalyst system.

TABLE 6

| Temperature (° C.) | % CO Conversion |
| --- | --- |
| 200 | 6.5 |
| 240 | 26.8 |
| 290 | 73.4 |
| 300 | 74.8 |
| 350 | 81.9 |

Example 7

The Use of Solid Carbon Materials as Catalysts for the Conversion of $N_2O$ to $N_2$ and $O_2$ In this set of experiments the catalytic performance of various carbon materials was evaluated for the $N_2O$ decomposition using a fixed bed micro-reactor system. Typically, 100-mg carbon catalyst was used and the rate of the feed gas mixture $N_2O$/He was regulated by MKS mass flow controllers with a total flow rate of 50 cc/min. The conversion of $N_2O$ was calculated from the amount of $N_2$ formed during the reaction under given conditions. A comparison of the performance of the various carbon materials as a function of temperature is given in Table 7 below. From these data it can be seen that the nanofibers exhibit the highest activity with the lowest conversions taking place over pitch-based carbon fibers. The presence and nature of reactive edge sites is once again of paramount importance in determining the catalytic performance of the solid carbon catalyst.

TABLE 7

| Temperature (° C.) | Wt. % $N_2O$ Conversion | | | | |
| --- | --- | --- | --- | --- | --- |
| | GNF-H | GNF-P | GNF-T | AC | Pitch Fibers |
| 450 | 3.2 | 2.5 | 2.1 | 1.0 | 0 |
| 500 | 9.5 | 8.9 | 5.3 | 2.1 | 0 |
| 550 | 34.2 | 28.4 | 17.9 | 12.6 | 0 |
| 600 | 59.5 | 57.9 | 49.5 | 27.3 | 1.0 |
| 650 | 76.3 | 76.8 | 74.7 | 54.2 | 2.0 |

Example 8

The Use of Solid Carbon Materials as Catalysts for the Conversion of $N_2O$/CO Mixtures to $N_2$ and $CO_2$ A similar set of experiments to those described in Example 7 above was carried out in the presence of equimolar mixture of $N_2O$ and CO. Inspection of the results given in Table 8 below show that the most active catalyst was GNF-H closely followed by GNF-T. While active carbon exhibited modest activity for this reaction, the performance of pitch-based carbon fibers was very poor.

TABLE 8

| Temperature (° C.) | Wt. % $N_2O$ Conversion | | | |
| --- | --- | --- | --- | --- |
| | GNF-H | GNF-T | AC | Pitch Fibers |
| 300 | 2.8 | 2.8 | 0 | 0 |
| 350 | 4.4 | 4.0 | 3.3 | 0 |
| 400 | 15.0 | 5.6 | 4.4 | 0 |
| 450 | 72.8 | 28.9 | 11.1 | 2.2 |
| 500 | 90.6 | 61.7 | 23.3 | 3.9 |
| 550 | 100.0 | 86.7 | 44.4 | 7.8 |

Example 9

The Use of Solid Carbon Materials as Catalysts for the Oxidative Dehydrogenation of Ethylbenzene to Styrene The oxidative dehydrogenation reactions were carried out in a packed bed tubular quartz flow reactor system. The flow rates of the gaseous reactants, oxygen and helium, were regulated by MKS mass flow controllers. Ethylbenzene (EB) was introduced into the reactor using a syringe pump. The inlet and outlet gas analyses were performed on-line using a gas chromatograph equipped with TCD and FID detectors. The performance of each catalyst sample was determined from the conversion of EB, the selectivity to styrene (ST) and the resulting yield of styrene. These values were calculated according to the following equations:

$$EB_{conversion} = \frac{n_{EB_{in}} - n_{EB_{ex}}}{n_{EB_{in}}} \quad (1)$$

$$ST_{selectivity} = \frac{n_{ST_{ex}}}{n_{EB_{in}} - n_{EB_{ex}}} \quad (2)$$

$$ST_{yield} = \frac{n_{ST_{ex}}}{n_{EB_{ex}}} \quad (3)$$

where, n is the number of moles of a given compound, "in" and "ex" refer to inlet and exit, respectively.

In this series of experiments the behavior of multi-faceted "tubular" and "platelet" GNF materials was investigated for synthesis of styrene as a function temperature. Table 9 below shows the behavior of the "tubular GNF at temperatures between 350° and 450° C. The reaction conditions were as follows: mole ratio $O_2$/EB=2.75, EB flow rate=0.622 mL/hr, $O_2$=5.0 mL/min, He=20.0 mL/min, catalyst weight=20 mg. Examination of these data shows that as the reaction temperature is progressively raised there is a concomitant increase in EB conversion, selectivity and yield of styrene. The best performance was achieved at 450° C.

TABLE 9

| Temperature (° C.) | EB Conversion (%) | ST Selectivity (%) | ST Yield (%) |
| --- | --- | --- | --- |
| 350 | 24.7 | 34.0 | 7.6 |
| 400 | 58.8 | 40.0 | 23.5 |
| 450 | 58.4 | 47.3 | 27.5 |

The behavior described for multi-faceted "tubular" GNF is to be contrasted with that of "platelet" GNF materials that consist of about 95% edge regions, but do not display such activity in this low temperature range. For this set of experiments the reaction conditions were as follows: mole ratio $O_2$/EB=1.0, EB flow rate=0.094 mL/hr, $O_2$=10.0 mL/min, He=10.0 mL/min, catalyst weight=21 mg. Inspection of the data given in Table 10 below reveals that "platelet" GNF is not as active for $O_2$ dissociation and can therefore be utilized at higher temperatures than the previous materials. Under these conditions it was possible to attain extremely high selectivity towards styrene formation. The highest styrene selectivity and yield was obtained at 545° C. Based on these data one can conclude that there is a significant difference in the nature of the active edge sites on the two types of GNF materials.

TABLE 10

| Temperature (° C.) | EB Conversion (%) | ST Selectivity (%) | ST Yield (%) |
|---|---|---|---|
| 515 | 29.0 | 98.1 | 28.4 |
| 545 | 39.8 | 93.9 | 37.0 |
| 575 | 30.4 | 88.1 | 27.0 |

The effect of increasing reaction time on the performance of the "tubular" and "platelet" GNF catalysts was examined in order to gain some measure of the activity maintenance. From the data presented in Tables 11 and 12 below, respectively, it is evident that the performance of these materials is very stable with no signs of deactivation over a 5-hour period.

TABLE 11

| Reaction Time (h) | EB conversion (%) | ST selectivity (%) | ST yield (%) |
|---|---|---|---|
| 0.35 | 62.7 | 31.2 | 19.5 |
| 0.77 | 64.3 | 31.7 | 20.4 |
| 1.33 | 67.1 | 30.3 | 20.3 |
| 1.73 | 67.8 | 30.4 | 20.6 |
| 2.25 | 66.7 | 32.2 | 21.5 |
| 2.75 | 68.9 | 31.7 | 21.8 |
| 3.48 | 70.1 | 31.3 | 21.9 |
| 4.30 | 70.6 | 32.0 | 22.6 |
| 4.70 | 71.1 | 30.2 | 21.5 |
| 5.20 | 68.9 | 34.8 | 23.8 |

TABLE 12

| Reaction Time (h) | EB conversion (%) | ST selectivity (%) | ST yield (%) |
|---|---|---|---|
| 0.37 | 33.7 | 99.0 | 33.4 |
| 0.77 | 41.4 | 94.7 | 32.9 |
| 1.18 | 40.6 | 87.4 | 35.5 |
| 1.60 | 34.7 | 99.5 | 34.6 |
| 1.93 | 36.6 | 93.1 | 34.1 |
| 2.36 | 34.7 | 95.5 | 33.1 |
| 4.30 | 36.8 | 96.7 | 34.9 |
| 4.70 | 35.9 | 97.1 | 35.1 |
| 5.20 | 36.7 | 97.2 | 35.0 |

In a final set of experiments the activities and selectivities of the two types of GNF structures were compared to those of a commercial catalyst (Fe,Cr,K mixed oxides) when operated at the respective optimum conditions for the current systems. Inspection of the results given in Tables 13 and 14 below demonstrates that, under these circumstances, both of the GNF materials performed in a superior manner to that of the commercial catalyst. It is apparent that the latter catalyst exhibits very low activity at 450° C. and although this value increases when the reaction is carried out at 545° C., the performance is inferior to that of the "platelet" GNF.

TABLE 13

| Catalyst | EB conversion (%) | ST selectivity (%) | ST yield (%) |
|---|---|---|---|
| "Tubular" GNF | 52.8 | 54.4 | 28.6 |
| Fe, Cr, K oxides | 17.1 | 13.5 | 2.2 |

TABLE 14

| Catalyst | EB conversion (%) | ST selectivity (%) | ST yield (%) |
|---|---|---|---|
| "Platelet" GNF | 39.8 | 93.9 | 37.0 |
| Fe, Cr, K oxides | 13.9 | 73.3 | 9.9 |

Example 10

Percent Weight Loss Resulting from the Interaction of Multi-Faceted "Tubular" and "Platelet" Graphite Nanofibers with $O_2$ as a Function of Temperature

TABLE 15

| Temperature (° C.) | "Tubular" GNF | "Platelet" GNF |
|---|---|---|
| 400 | 0 | 0 |
| 450 | 0.5 | 0 |
| 500 | 4.0 | 0 |
| 550 | 21.5 | 0.5 |
| 600 | 42.0 | 4.5 |
| 650 | 60.0 | 65.5 |
| 700 | 82.5 | 95.5 |
| 750 | 100.0 | 100.0 |

Example 11

Percent Weight Loss Resulting from the Interaction of Multi-Faceted "Tubular" and "Platelet" Graphite Nanofibers with $CO_2$ as a Function of Temperature

TABLE 16

| Temperature (° C.) | "Tubular" GNF | "Platelet" GNF |
|---|---|---|
| 600 | 0 | 0 |
| 650 | 1.5 | 0 |
| 700 | 58.3 | 0 |
| 750 | 95.8 | 0 |
| 800 | 100.0 | 0 |
| 850 | 100.0 | 1.7 |
| 900 | 100.0 | 3.3 |
| 950 | 100.0 | 6.7 |
| 1000 | 100.0 | 22.5 |
| 1050 | 100.0 | 100.0 |

The data presented in Examples 9 and 10 clearly demonstrate that although both types of GNF are highly graphitic in nature as demonstrated by X-ray diffraction, the multi-faceted "tubular" materials possess an extraordinary ability to dissociate both $O_2$ and $CO_2$ at significantly lower temperatures than the "platelet" material. The behavior of the latter type of GNF is very close to that generally expected for traditional graphite materials.

What is claimed is:

1. A method for activating a catalyst composition for catalyzing a reaction selected from the group consisting of oxidation, hydrogenation, dehydrogenation, oxidative-hydrogenation, and oxidative-dehydrogenation, which catalyst composition is comprised of graphitic nanostructures which nanostructures are comprised of a plurality of graphite platelets aligned parallel, perpendicular, or at an angle to the longitudinal axis of the nanostructure and which graphitic nanostructures wherein at least about 50% of its edge sites are exposed, which method for activating comprises treating said nanostructures with a mixture of $CO_2$ and $H_2$ at an effective temperature for period of time from about 0.5 hours to about 70 hours.

2. The method of claim 1 wherein at least about 95% of the edge sites of said nanostructures are exposed.

3. The method of claim 1 wherein the graphite nanostructure is one wherein the graphite platelets are aligned substantially parallel to the longitudinal axis of the nanostructure.

4. The method of claim 1 wherein the graphite platelets are aligned substantially perpendicular to the longitudinal axis of the graphite nanostructure.

5. The method of claim 1 wherein at least about 95% of its edge sites of the nanostructures are exposed and wherein its graphite platelets of the nanostructures are aligned substantially parallel to the longitudinal axis of the nanostructure.

6. A catalytic process for converting $CO_2$ to CO and water, which process comprises reacting $CO_2$ and hydrogen in the presence of a graphitic nanostructure catalyst composition at a temperature from about 400° C. to about 475° C., which graphitic nanostructure catalyst composition comprised of graphitic nanostructures which nanostructures are comprised of a plurality of graphite platelets aligned parallel, perpendicular, or at an angle to the longitudinal axis of the nanostructure and wherein at least about 50% of the edge sites of said nanostructures are exposed.

7. The catalytic process of claim 6 wherein at least about 95% of the edge sites of said nanostructures are exposed.

8. The catalytic process of claim 6 wherein the graphite nanostructure is one wherein the graphite platelets are aligned substantially parallel to the longitudinal axis of the nanostructure.

9. The catalytic process of claim 6 wherein the graphite platelets are aligned substantially perpendicular to the longitudinal axis of the graphite nanostructure.

10. The catalytic process of claim 6 wherein at least about 95% of its edge sites of the nanostructures are exposed and wherein its graphite platelets of the nanostructures are aligned substantially parallel to the longitudinal axis of the nanostructure.

\* \* \* \* \*